(12) United States Patent
Liang

(10) Patent No.: US 12,224,614 B2
(45) Date of Patent: Feb. 11, 2025

(54) CHARGING SYSTEM, METHOD AND DEVICE FOR CONTROLLING CHARGING SYSTEM, AND ELECTRONIC DEVICE

(71) Applicant: BEIJING XIAOMI MOBILE SOFTWARE CO., LTD., Beijing (CN)

(72) Inventor: Lei Liang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 637 days.

(21) Appl. No.: 17/583,979

(22) Filed: Jan. 25, 2022

(65) Prior Publication Data

US 2023/0045028 A1  Feb. 9, 2023

(30) Foreign Application Priority Data

Aug. 3, 2021  (CN) .......................... 202110886171.9

(51) Int. Cl.
*H02J 7/00* (2006.01)
*H02J 7/34* (2006.01)

(52) U.S. Cl.
CPC .... *H02J 7/007182* (2020.01); *H02J 7/00714* (2020.01); *H02J 7/345* (2013.01); *H02J 2207/20* (2020.01)

(58) Field of Classification Search
CPC .. H02J 7/007182; H02J 7/00714; H02J 7/345; H02J 2207/20

(Continued)

(56) References Cited

U.S. PATENT DOCUMENTS 11,163,006 B2 * 11/2021 Coenen ................. H02J 7/0048
11,757,364 B2 *  9/2023 Shim ................. H02M 3/33584
                                                    307/82

(Continued)

FOREIGN PATENT DOCUMENTS

CN    110892603  A  *  3/2018  ............... H02J 3/32
CN    113098109  A     7/2021

(Continued)

OTHER PUBLICATIONS

Liu et al., Chinese Patent Document No. CN-107769236-A, published Mar. 6, 2018, 4 pages including abstract, claims and 1 drawing. (Year: 2018).*

(Continued)

*Primary Examiner* — Phallaka Kik
(74) *Attorney, Agent, or Firm* — Cozen O'Connor

(57) ABSTRACT

A charging system includes: a power management integrated circuit, a bidirectional voltage conversion circuit, a controller and a battery level detection circuit. The bidirectional voltage conversion circuit is configured to work in a working mode including at least a boost mode and a buck mode. The controller has a first terminal. An input terminal of the battery level detection circuit is connected to a battery, an output terminal of the battery level detection circuit is connected to the first input terminal of the controller, and the battery level detection circuit is configured to detect a voltage and a current of the battery and transmit the voltage and the current of the battery to the controller. The controller is configured to control the working mode of the bidirectional voltage conversion circuit and a working state of the power management integrated circuit according to the battery voltage and the current.

20 Claims, 3 Drawing Sheets

(58) Field of Classification Search
USPC .................. 320/134, 136, 137, 140, 162
See application file for complete search history.

(56) References Cited

U.S. PATENT DOCUMENTS

| | | | | |
|---|---|---|---|---|
| 11,916,511 | B1* | 2/2024 | Atcitty | H02J 7/35 |
| 2010/0164446 | A1* | 7/2010 | Matsuo | H02M 3/158 |
| | | | | 323/282 |
| 2011/0025125 | A1* | 2/2011 | Brabec | H02J 7/0071 |
| | | | | 307/9.1 |
| 2013/0320918 | A1* | 12/2013 | Ohmer | H01M 10/4207 |
| | | | | 429/61 |
| 2015/0207354 | A1* | 7/2015 | Naskali | H02J 7/342 |
| | | | | 320/103 |
| 2016/0031330 | A1* | 2/2016 | Ishigaki | H02J 7/342 |
| | | | | 307/20 |
| 2016/0254689 | A1* | 9/2016 | Lee | H02M 3/158 |
| | | | | 320/107 |
| 2017/0054303 | A1* | 2/2017 | Choi | H02J 7/007182 |
| 2017/0222463 | A1 | 8/2017 | Pullen et al. | |
| 2017/0271865 | A1* | 9/2017 | Andrea | H02H 9/002 |
| 2017/0288416 | A1* | 10/2017 | Yamaguchi | H02M 3/04 |
| 2017/0317503 | A1* | 11/2017 | Ohashi | H02S 10/20 |
| 2018/0145525 | A1 | 5/2018 | Du et al. | |
| 2021/0013729 | A1* | 1/2021 | Chou | H01M 10/425 |
| 2021/0249870 | A1* | 8/2021 | Lan | H02J 7/0031 |
| 2022/0209552 | A1* | 6/2022 | Park | H02J 7/0068 |
| 2022/0231535 | A1* | 7/2022 | Hu | H02J 7/02 |
| 2023/0024417 | A1* | 1/2023 | Yamaguchi | H02J 7/00714 |
| 2023/0076747 | A1* | 3/2023 | Suzuki | H01M 10/48 |
| 2023/0261506 | A1* | 8/2023 | Huang | H02J 7/0047 |
| | | | | 307/10.6 |
| 2023/0261507 | A1* | 8/2023 | Huang | H02J 7/34 |
| | | | | 307/10.6 |
| 2024/0109456 | A1* | 4/2024 | Lu | B60L 53/80 |

FOREIGN PATENT DOCUMENTS

| | | |
|---|---|---|
| EP | 3846275 A1 | 7/2021 |
| WO | WO-2020063056 A1 * | 4/2020 |

OTHER PUBLICATIONS

Yang, Chinese Patent Document No. CN-104079029-A, published Oct. 1, 2014, 3 pages including abstract, claims and 1 drawing. (Year: 2014).*

Guo, Chiense Patent Document No. CN-206364704-U, published Jul. 28, 2017, 3 pages including abstract, claims and 1 drawing. (Year: 2017).*

Guo, English Machine Translation of Chinese Patent Document No. CN-206364704-U, published Jul. 28, 2017, machine tralsated on Nov. 23, 2024 by WIPO PatentScope website, 3 pages. (Year: 2024).*

European Patent Application No. 22153633.7, Search and Opinion dated Jul. 21, 2022, 9 pages.

* cited by examiner

CHARGING SYSTEM, METHOD AND DEVICE FOR CONTROLLING CHARGING SYSTEM, AND ELECTRONIC DEVICE

CROSS-REFERENCE TO RELATED APPLICATIONS

This application is based upon and claims priority to Chinese Patent Application No. 202110886171.9, filed on Aug. 3, 2021, the entire content of which is incorporated herein by reference for all purposes.

TECHNICAL FIELD

The present disclosure generally relates to a field of charging technologies, and more particularly to a charging system, a method and a device for controlling the charging system, and an electronic device including the charging system.

BACKGROUND

Electronic devices usually have lithium batteries that can be charged in cycles. With the development of the circuit technology, in order to meet the charging requirements, the charging power is gradually increasing. Although the rapid development of the charging power has been achieved, other components of the electronic devices cannot keep up with the development of the batteries and meet the requirements of the batteries. Therefore, there is still a need for manufacturers to provide a reliable charging system.

SUMMARY

Embodiments of the present disclosure seek to solve at least one of the problems existing in the related art to at least some extent.

In a first aspect of the present disclosure, a charging system includes: a power management integrated circuit, a bidirectional voltage conversion circuit, a controller and a battery level detection circuit. The bidirectional voltage conversion circuit is configured to work in a working mode including at least a boost mode and a buck mode. The controller has a first terminal. An input terminal of the battery level detection circuit is connected to a battery, an output terminal of the battery level detection circuit is connected to the first input terminal of the controller, and the battery level detection circuit is configured to detect a voltage and a current of the battery and transmit the voltage and the current of the battery to the controller. The controller is configured to control the working mode of the bidirectional voltage conversion circuit and a working state of the power management integrated circuit according to the battery voltage and the current.

In a second aspect of the present disclosure, a method for controlling a charging system is provided. The charging system includes: a power management integrated circuit, a bidirectional voltage conversion circuit, a controller and a battery level detection circuit. The bidirectional voltage conversion circuit is configured to work in a working mode including at least a boost mode and a buck mode. The controller has a first terminal. An input terminal of the battery level detection circuit is connected to a battery, an output terminal of the battery level detection circuit is connected to the first input terminal of the controller, and the battery level detection circuit is configured to detect a voltage and a current of the battery and transmit the voltage and the current of the battery to the controller. The controller is configured to control the working mode of the bidirectional voltage conversion circuit and a working state of the power management integrated circuit according to the battery voltage and the current. The method for controlling the charging system includes: determining a voltage and a current of a battery to be charged, and controlling the working mode of the bidirectional voltage conversion circuit and the working state of the power management integrated circuit according to the voltage and the current of the battery.

In a third aspect of the present disclosure, an electronic device includes a charging system. The charging system includes: a power management integrated circuit, a bidirectional voltage conversion circuit, a controller and a battery level detection circuit. The bidirectional voltage conversion circuit is configured to work in a working mode including at least a boost mode and a buck mode. The controller has a first terminal. An input terminal of the battery level detection circuit is connected to a battery, an output terminal of the battery level detection circuit is connected to the first input terminal of the controller, and the battery level detection circuit is configured to detect a voltage and a current of the battery and transmit the voltage and the current of the battery to the controller. The controller is configured to control the working mode of the bidirectional voltage conversion circuit and a working state of the power management integrated circuit according to the battery voltage and the current.

It should be understood that both the above general description and the following detailed description are explanatory and illustrative only and shall not be construed to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1A:
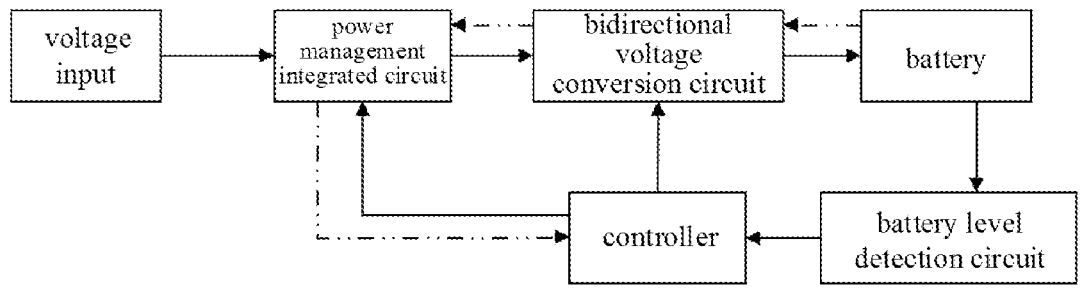
FIG. 1A is a block diagram of a charging system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

With reference to the accompanying drawings, a charging system, a method and device for controlling a charging system, and an electronic device including a charging system of the embodiments of the present disclosure are described as follows.

The method for controlling the charging system provided in the embodiments of the present disclosure can be performed by the device for controlling the charging system provided in the embodiments of the present disclosure, and the device can be disposed in the electronic device. FIGS. 1A, 1B, 1C and 2 show the charging systems of the present disclosure.

As shown in FIG. 1A, the charging system includes a power management integrated circuit (PMIC), a battery level detection circuit, a bidirectional voltage conversion circuit and a controller. The battery level detection circuit has an input terminal connected to the battery, and an output terminal connected to a first input terminal of the controller. The power management integrated circuit is an integrated circuit that can be used for voltage conversion, voltage stabilization, and battery management, and be able to deal with a timing sequence of a powder system, supply power to a variety of loads, and provide protection function in case of overvoltage, undervoltage, overcurrent and thermal fault.

In some embodiments, the power management integrated circuit may be any integrated circuit or chip that can realize the voltage conversion, the voltage stabilization, and the battery management. Specification, model, and size of the power management integrated circuit are not limited in the present disclosure.

In addition, the bidirectional voltage conversion circuit may be operated in a working mode including at least a boost mode and a buck mode. In some embodiments, in the bidirectional voltage conversion circuit, a voltage conversion ratio for the boost mode or the buck mode is preset.

For example, the boost mode of the bidirectional voltage conversion circuit has a voltage conversion ratio of 2:3, and the buck mode of the bidirectional voltage conversion circuit has a voltage conversion ratio of 3:2. For another example, the boost mode of the bidirectional voltage conversion circuit has a voltage conversion ratio of 1:2, and the buck mode of the bidirectional voltage conversion circuit has a voltage conversion ratio of 2:1. In the present disclosure, the ratio is not limited.

Further, the battery level detection circuit can transmit battery voltage and current of the battery, which are detected by the circuit, to the controller. The battery level detection circuit may be any circuit or chip that can realize such a function, which is not limited herein. The battery voltage may represent a current voltage level, and the current may reflect a difference between an output voltage of a charging branch and the battery voltage.

In the embodiments of the present disclosure, the battery may be a double-battery string, that is, two batteries connected in series, which is not limited herein. In addition, the voltage conversion ratio of the bidirectional voltage conversion circuit may be selected or set according to the number or connection mode of batteries. For example, when the battery is a double-battery string, the battery string is considered as a high-voltage battery having a voltage of 8V. During power supply for a system, 8V needs to be converted into 4V since most chips in the mobile phones are designed with a withstand voltage of 4V. To supply power to these chips, this specification should be followed. Accordingly, when the bidirectional voltage conversion circuit works in the buck mode with the voltage conversion ratio of 2:1, 8V provided by the battery is directly converted into 4V required by the system for power supply.

On this basis, in the embodiments of the present disclosure, the controller is configured to control the working mode of the bidirectional voltage conversion circuit and a working state of the power management integrated circuit according to the battery voltage and the current. The working status of the power management integrated circuit may be used to indicate whether the power management integrated circuit is working in a charging state or in a discharging state, and indicate a working time of an internal power device when the power management integrated circuit is working in the charging state.

For example, when the battery voltage is 1V, the current is a rated current of 1.5 A, the bidirectional voltage conversion circuit is in the boost mode, and the current voltage conversion ratio is 1:3, the controller may control the working state of the power management integrated circuit to be the charging state. Further, the controller may determine the difference between a voltage output by the charging circuit and the battery voltage according to the current detected by the battery level detection circuit, and then may determine the working time of the charging branch. The working time may be such as 2 min, or 5 min. For another example, when the battery voltage is 4V and the voltage conversion ratio of the bidirectional voltage conversion circuit is 3:1, the working state of the power management integrated circuit may be controlled to be the discharging state.

It should be noted that the above examples of the battery voltage, the voltage conversion ratio, and the working status of the power management integrated circuit shall not be construed as limitations on the present disclosure.

In some embodiments, as shown in FIG. 1A, a first input terminal of the power management integrated circuit is connected to a voltage input, a first output terminal of the power management integrated circuit is connected to a first terminal of the bidirectional voltage conversion circuit, and a control terminal of the power management integrated circuit is connected to a first output terminal of the controller. A second terminal of the bidirectional voltage conversion circuit is connected to a battery. A control terminal of the bidirectional voltage conversion circuit is connected to a second output terminal of the controller. An input terminal of the battery level detection circuit is connected to the battery, and an output terminal of the battery level detection circuit is connected to a first input terminal of the controller. Therefore, when the charging system works in a battery charging state, the controller controls the working mode of the bidirectional voltage conversion circuit to be the boost mode, and controls the power management integrated circuit to be in the charging state, and thus the battery can be charged.

It should be understood that lines in the drawings show the connections between the electronic elements and shall not be construed to limit the present disclosure. For example, as shown in FIG. 1A, a solid line and a dotted line represent the connection between the power management integrated circuit and the bidirectional voltage conversion circuit, and they may be separate connecting paths or one path, they may be one wire or multiple wires. For example, the first terminal of the bidirectional voltage conversion circuit includes a first input terminal and a first output terminal, and the first output terminal of the power management integrated circuit is connected to the first input terminal of the bidirectional voltage conversion circuit, and a second input terminal of the power management integrated circuit is connected to the first output terminal of the bidirectional voltage conversion circuit. That is, the solid line represents a case when a current flows from the power management integrated circuit to the bidirectional voltage conversion circuit and the dotted line represents a case when a current flows from the bidirectional voltage conversion circuit to the power management integrated circuit. Such a connection relationship can be realized by two separate wires or one wire. On this basis, multiple connection points/terminals of an electronic element in the drawings may be realized by one terminal.

In some embodiments, a second input terminal of the power management integrated circuit is connected to the first terminal of the bidirectional voltage conversion circuit, and a second output terminal of the power management integrated circuit is connected to a power supply terminal of the controller. The connection relationship is indicated by a double-dot dashed line as shown in FIG. 1A. Therefore, when the charging system works in the battery discharging state, the controller controls the working mode of the bidirectional voltage conversion circuit to be the buck mode, and controls the power management integrated circuit to be in the discharging state, and thus the battery supplies power to the load system.

It should be understood that in practice, the circuit structure can be adjusted as required. For example, the charging system may be added with other components such as an over voltage protection (OVP) circuit and a connector, which are not limited in the present disclosure.

In some embodiments, an over voltage protection circuit and a connector are added in the circuit. On the basis of FIG. 1A, such a structure of the charging system may be illustrated in a block diagram of FIG. 1B.

Figure 1B:
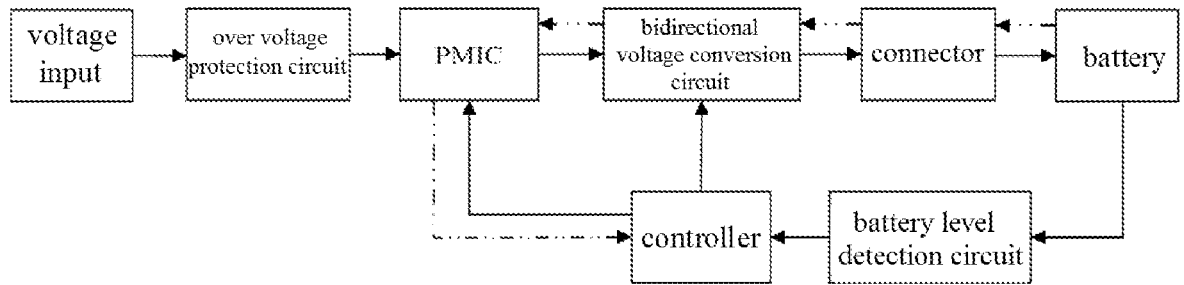
FIG. 1B is a block diagram of a charging system according to an embodiment of the present disclosure.

As shown in FIG. 1B, an input terminal of an over voltage protection circuit is connected to a voltage input, and an output terminal of the over voltage protection circuit is connected to a first input terminal of the power management integrated circuit. A first output terminal and a second input terminal of the power management integrated circuit are connected to a first terminal of the bidirectional voltage conversion circuit, a second output terminal of the power management integrated circuit is connected to a power supply terminal of the controller, and a control terminal of the power management integrated circuit is connected to a first output terminal of the controller. A second terminal of the bidirectional voltage conversion circuit is connected to a first terminal of a connector, and a second terminal of the connector is connected to a battery. A control terminal of the bidirectional voltage conversion circuit is connected to a second output terminal of the controller. An input terminal of the battery level detection circuit is connected with the battery to detect a voltage and current of the battery, and an output terminal of the battery level detection circuit is connected to a first input terminal of the controller to transmit the battery voltage and current to the controller. The over voltage protection circuit can avoid overvoltage input from the power supply to sensitive elements, thereby preventing the elements from being damaged by the overvoltage, and providing protection for the circuit.

In the charging system provided in the embodiments of the present disclosure, the controller is configured to control the working mode of the bidirectional voltage conversion circuit and the working state of the power management integrated circuit according to the battery voltage and the current. Therefore, batteries of various voltage levels can be charged by the present charging system, which has a simple circuit structure and a low cost.

It should be understood that, in practice, the charging system may further include a capacitive voltage conversion circuit and a handshake circuit. On the basis of FIG. 1A, such a structure of the charging system may be illustrated in a block diagram of FIG. 1C.

Figure 1C:
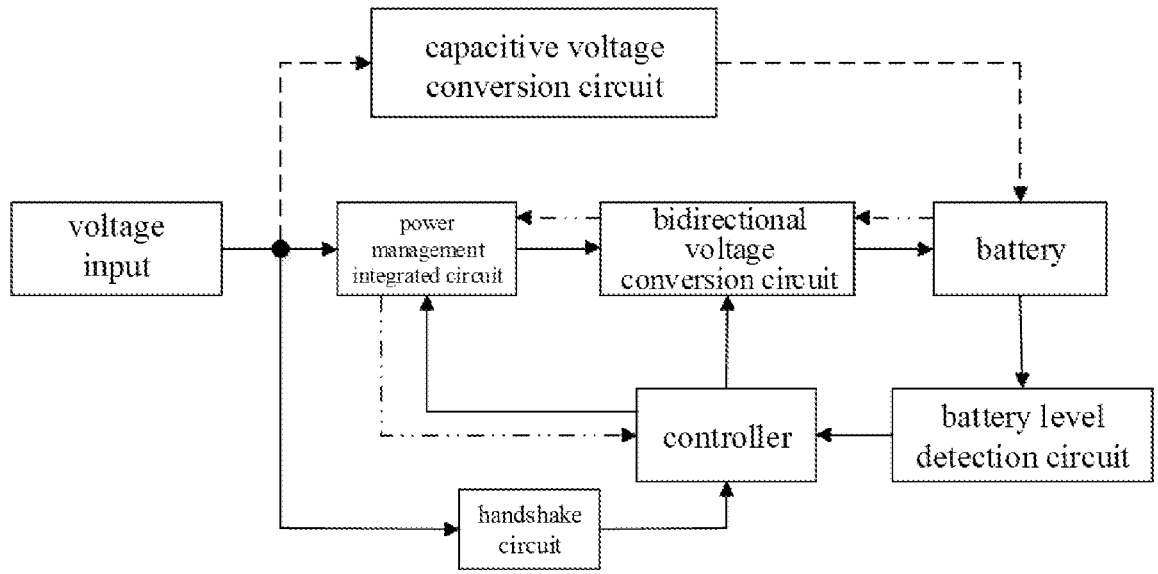
FIG. 1C is a block diagram of a charging system according to an embodiment of the present disclosure.

FIG. 1C is a block diagram of a charging system according to an embodiment of the present disclosure. As shown in FIG. 1C, an input terminal of the handshake circuit is connected to the voltage input, and an output terminal of the handshake circuit is connected to a second input terminal of the controller. An input terminal of the capacitive voltage conversion circuit is connected to the voltage input, and an output terminal of the capacitive voltage conversion circuit is connected to the battery. The capacitive voltage conversion circuit is configured to charge the battery.

Further, the first input terminal of the power management integrated circuit is connected to the voltage input, the first output terminal and the second input terminal of the power management integrated circuit are connected to a first terminal of the bidirectional voltage conversion circuit, the second output terminal of the power management integrated circuit is connected to the power supply terminal of the controller, and the control terminal of the power management integrated circuit is connected to the first output terminal of the controller. A second terminal of the bidirectional voltage conversion circuit is connected to the battery. The control terminal of the bidirectional voltage conversion circuit is connected to the second output terminal of the controller. The input terminal of the battery level detection circuit is connected to the battery, and the output terminal of the battery level detection circuit is connected to the first input terminal of the controller.

In the circuit structure shown in FIG. 1C, elements connected by a dashed line constitute a fast charging circuit, and elements connected by a double-dot dashed line constitute a discharging branch. The handshake circuit can communicate with a power adapter to determine a type of the power adapter and send the type of the power adapter to the controller. In some embodiments, the power adapter can be of any type, for example, it may be a power adapter that supports a normal charging process, or it may be a power adapter that supports a fast charging process, which is not limited in the present disclosure. In some embodiments, the capacitive voltage conversion circuit, which may also referred as a charge pump, is an energy storage converter that uses a flying or pumping capacitor to increase or decrease the input voltage to achieve the fast charging.

It should be understood that in the embodiments of the present disclosure, the charging system may include one or more capacitive voltage conversion circuits, which is not limited herein.

It should be understood that if the power adapter of one type supports the fast charging, it can be determined that it matches the capacitive voltage conversion circuit, to perform the fast charging.

On this basis, in some embodiments, when the type of the power adapter matches the capacitive voltage conversion circuit, the controller is further configured to control the capacitive voltage conversion circuit to work, and control the power management integrated circuit and the bidirectional voltage conversion circuit to stop working.

When the type of the power adapter does not match the capacitive voltage conversion circuit, the controller is further configured to control the capacitive voltage conversion circuit to stop working, and control the power management integrated circuit and the bidirectional voltage conversion circuit to work.

For example, if the power adapter of one type supports a normal charging, and it does not match the capacitive voltage conversion circuit, the controller controls the capacitive voltage conversion circuit to stop working, and controls the power management integrated circuit to work in the battery charging state, and the bidirectional voltage conversion circuit to work in the boost mode.

It should be noted that the above examples of the type of the power adapter, the working state of the bidirectional voltage conversion circuit and the capacitive voltage conversion circuit shall not be construed to limit the present disclosure.

In the embodiments of the present disclosure, the charging system can determine the type of the power adapter through the handshake circuit, and then the controller can control to use a voltage conversion circuit matching with the power adapter, thereby not only meeting the charging requirements, but also improving the charging efficiency as much as possible.

In some embodiments, the boost mode of the bidirectional voltage conversion circuit has a voltage conversion ratio of 1:N, and the buck mode of the bidirectional voltage conversion circuit has a voltage conversion ratio of N:1, where N is a positive number greater than 1. On this basis, when the charging system works in the battery charging state, the control can control the working mode of the bidirectional voltage conversion circuit to be the boost mode, and control an output voltage of a charging branch in the power management integrated circuit according to the battery voltage, the current, and a value of N.

For example, N is 2. The charging system works in the battery charging state, and the bidirectional voltage conversion circuit works in the boost mode with a voltage conversion ratio of 1:2. If the battery voltage is 3V, and the current is a rated current of 1 A, the power management integrated circuit can be controlled to make the output voltage of the charging branch in the power management integrated circuit no less than 1.5V or 1.55V, to allow the battery to be charged.

In some embodiments, when the charging system works in the battery discharging state, the bidirectional voltage conversion circuit is controlled to work in the buck mode, and the discharging branch of the power management integrated circuit is controlled to work.

For example, N is 2. The charging system works in the battery discharging state, and the bidirectional voltage conversion circuit works in the buck mode with a voltage conversion ratio of 2:1. In a case where the battery voltage is 4V, the discharging branch of the power management integrated circuit is controlled to work and to output a voltage of 2V. Such an output voltage may be used to provide power to the system to meet the power demand of the system, which is not limited in the present disclosure.

The double-dot dashed line shown in FIG. 1C represents a connection relationship.

In the embodiments of the present disclosure, when the charging system works in the battery discharging state, the controller can control the working mode of the bidirectional voltage conversion circuit and the working state of the power management integrated circuit to supply power to the system. Therefore, the charging system of the present disclosure has a simple circuit structure and a low cost.

In an embodiment, when the charging system works in the battery charging state, the output voltage of the charging branch in the power management integrated circuit is controlled periodically (i.e., in a preset period) according to the battery voltage, the current, and the value of N, until the battery voltage reaches a first threshold, and the current reaches a second threshold.

In an embodiment, the preset period may be a time period set in advance, for example, it may be 1 s or 0.5 ms, which is not limited in the present disclosure.

In addition, the first threshold and the second threshold may be preset, which are not limited herein.

For example, N is 2 and the preset period is 1 s. The charging system works in the battery charging state, and the bidirectional voltage conversion circuit works in the boost mode with a voltage conversion ratio of 1:2. The first threshold is 3V, and the second threshold is 0.01 A. If the battery voltage is 2.8V and the current is 1 A at a time $t_1$, the output voltage of the charging branch in the power management integrated circuit is controlled to be 1.4V, and the battery is charged according to the output voltage of 1.4V. The battery voltage and the current are detected in the preset period. At a time $(t_1+1\ s)$, it is detected that the battery voltage is 2.95V and the current is 0.5 A, the output voltage of the charging branch in the power management integrated circuit is controlled to be 1.45V, and the battery is charged according to the output voltage of 1.45V. The battery voltage and the current are further detected periodically. At a time $(t_1+2\ s)$, it is detected that the battery voltage is 3V and the current is 0.3 A, the output voltage of the charging branch in the power management integrated circuit is controlled to be 1.5V to continue charging the battery. The battery voltage and the current are further detected in a next preset period. That is, at a time $(t_1+3\ s)$, it is detected that the battery voltage is 3V and the current is 0.01 A, it can be determined that the battery voltage reaches the first threshold and the current reaches the second threshold. At this time, the battery can be charged continuously according to the current output voltage.

It should be noted that the above examples of the N value, the voltage conversion ratio, the battery voltages and the output voltage of the power management integrated circuit shall not be construed to limit the present disclosure.

It should be understood that in practice, in order to ensure the continuity and stability of the entire charging process, a voltage margin can be set in advance, to allow the voltage output by the bidirectional voltage conversion circuit to be slightly larger than that of the battery, which creates a voltage difference to charge the battery.

In addition, in some embodiments, when the charging system works in the battery charging state and the current is less than the second threshold, the controller can determine a reference output voltage of the power management integrated circuit according to the battery voltage and the value of N, determine a target output voltage of the charging branch in the power management integrated circuit according to the reference output voltage and the preset voltage margin, and adjust a turn-on frequency and a duty cycle of a power switching device in the power management integrated circuit, to allow the output voltage of the charging branch to be the target output voltage.

The second threshold may be a value set in advance, such as 0.01 A and 0.1 A, which is not limited in the present disclosure. In addition, the preset voltage margin may be determined by measuring an impedance of the circuit after the circuit layout is completed. It can be understood that the preset voltage margins corresponding to different circuit layouts may be the same or may be different, which is not limited in the present disclosure.

For example, N is 3, and the current is less than the second threshold. If the current battery voltage is 3V, it can be determined that the reference output voltage of the power management integrated circuit is 1V. If the preset voltage margin is 0.1V, it can be determined that the target output voltage of the power management integrated circuit should be no lower than 1.1V, for example, it can be 1.2V or 1.3V. For example, if the target output voltage is 1.15V, the turn-on frequency and duty cycle of the power switching device in the power management integrated circuit can be adjusted, to allow the output voltage of the charging branch to be the target output voltage of 1.15V.

It should be noted that the above examples of the N value, the battery voltage, the voltage margin and the target output voltage of the power management integrated circuit shall not be construed to limit the present disclosure.

In the charging system provided in the embodiments of the present disclosure, the controller is able to control the working states of the power management integrated circuit, the bidirectional voltage conversion circuit and the capacitive voltage conversion circuit according to the working state of the charging system, to charge batteries of various voltage levels. The present charging system has a simple circuit structure and a low cost.

It should be understood that in practice, for the charging system shown in FIG. 1C, the circuit structure can be adjusted as needed, such as added with other circuit elements or structures, such as an over voltage protection circuit and a connector. The structure shown in the figures are only illustrated, and shall not be construed to limit the present disclosure.

It should be understood that the charging system provided in the present disclosure can be applied in any charging scene, and the circuit structure can be adjusted as required. For example, FIG. 2 shows a schematic diagram of a mobile phone charging system, where a type-c interface is connected to an over voltage protection (OVP) circuit.

Figure 2:
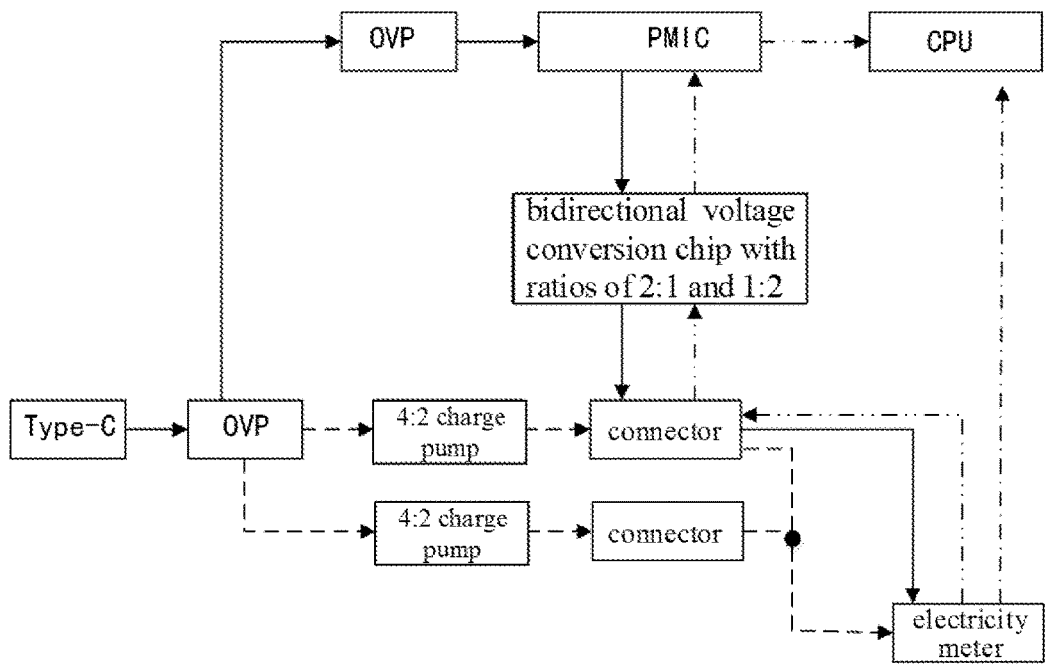
FIG. 2 is a block diagram of a charging system according to an embodiment of the present disclosure.

In FIG. 2, parts connected by a solid line represent a normal charging path. The OVP circuit (the one connected to the type-c interface) is connected to a second OVP circuit, and the second OVP circuit is connected to a power management integrated circuit (PMIC). The PMIC is connected to a terminal of a bidirectional voltage conversion chip having voltage conversion ratios of 2:1 and 1:2. Another terminal of the bidirectional voltage conversion chip is connected to a connector, and the connector is connected to an electricity meter.

In FIG. 2, parts connected by a dashed line represent a fast charging path. The OVP is connected to a 4:2 charge pump, the 4:2 charge pump is connected to a connector, and the connector is connected to the electricity meter. As shown in FIG. 2, there are two fast charging paths.

In FIG. 2, parts connected by a double-dot dashed line represent a discharging path. The electricity meter is connected to the connector, and the connector is connected to the bidirectional voltage conversion chip having the voltage conversion ratios of 2:1 and 1:2, and the bidirectional voltage conversion chip is connected to the PMIC. The PMIC is connected to a CPU. The electricity meter may detect the battery voltage and the current in real time.

In addition, FIG. 2 shows a communication path indicated by a dot dashed line. The electricity meter is communicated with the CPU, and thus the CPU can collect electricity meter information and acquire the battery voltage and the current.

For example, the process of using the bidirectional voltage conversion chip to charge the battery can be as follows.

First, the CPU can read the electricity meter information in a battery pack to acquire the battery voltage and the current. If the battery voltage is 3V at this time, the CPU controls the PMIC to output a voltage of 1.5V which is half of the battery voltage. After that, the CPU controls the bidirectional voltage conversion chip to work in the boost mode with a ratio of 1:2, and the voltage of 1.5V is converted into a voltage of 3V through the bidirectional voltage conversion chip, to charge the battery. After the battery is charged, the battery voltage will increase. For example, if the battery voltage rises to 3.1V, the electricity meter information is read again to acquire the battery voltage and the current. After that, the PMIC is controlled to output a higher voltage, for example of 1.505V, as the output voltage. In this case, the voltage output by the PMIC is converted into 3.1V through the bidirectional voltage conversion chip, to continue charging the battery. In this way, the battery may be charged in cycles according to the above process until the battery is fully charged.

Figure 3:
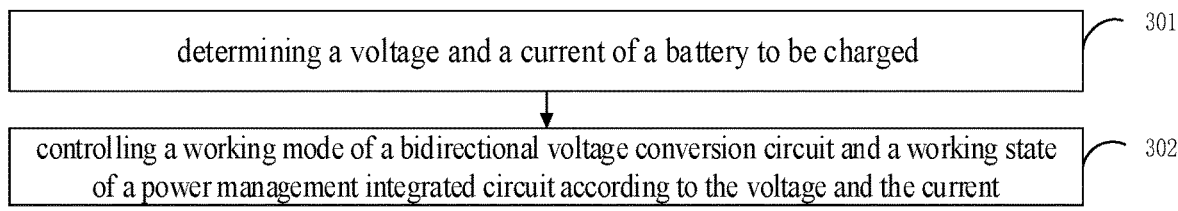
FIG. 3 is a flow chart of a method for controlling a charging system according to an embodiment of the present disclosure.

FIG. 3 is a flow chart of a method for controlling a charging system according to an embodiment of the present disclosure. As shown in FIG. 3, the method for controlling the charging system includes the following operations.

In block 301, a voltage and a current of a battery to be charged are determined.

It should be understood that the method for controlling the charging system of the present disclosure can be applied to any charging system provided in the present disclosure as shown in the block diagrams.

In addition, there are many ways to determine the battery voltage of the battery to be charged. For example, the battery level detection circuit in the charging system provided in the present disclosure may be used to determine the battery voltage of the battery to be charged. For another example, the voltage and the current of the battery to be charged may be detected separately to determine the battery voltage and current, which is not limited in the present disclosure.

In block 302, a working mode of a bidirectional voltage conversion circuit and a working state of a power management integrated circuit are controlled according to the voltage and the current of the battery.

The working mode of the bidirectional voltage conversion circuit includes a boost mode and a buck mode.

In an embodiment, the boost mode of the bidirectional voltage conversion circuit has a voltage conversion ratio of 1:N, and the buck mode of the bidirectional voltage conversion circuit has a voltage conversion ratio of N:1, where N is a positive number greater than 1. It should be understood that the value of N may be set in advance according to the circuit structure. For example, it may be 1.5, 2 or 3, which is not limited in the present disclosure.

In addition, the working status of the power management integrated circuit may be used to indicate whether the power management integrated circuit is working in a charging state or in a discharging state, and indicate a working time of an internal power device when the power management integrated circuit is working in the charging state.

When the above operation in block 302 is performed, the following situations may happen.

In a first situation, when the charging system works in the battery charging state, the working mode of the bidirectional voltage conversion circuit is controlled to the boost mode, and the output voltage of the charging branch in the power management integrated circuit is controlled according to the battery voltage, the current and the value of N.

For example, N is 2. The charging system works in the battery charging state, the battery voltage is 2V and the current is 1.2 A. In this case, the bidirectional voltage conversion circuit is controlled to work in the boost mode having the voltage conversion ratio of 1:2, and the output voltage of the charging branch in the power management integrated circuit is controlled to be 1V.

It should be noted that the above examples of N value, the battery voltage and the output voltage of the power management integrated circuit shall not be construed to limit the present disclosure.

In addition, the battery voltage and the current can be detected continuously and periodically to dynamically adjust the output voltage of the power management integrated circuit. In an embodiment, the output voltage of the charging branch in the power management integrated circuit is controlled periodically according to the battery voltage, the current and the value of N until the battery voltage reaches the first threshold and the current reaches the second threshold. In an embodiment, the preset period may be a time period set in advance, for example, it may be 1 s or 5 ms, which is not limited in the present disclosure.

In addition, the first threshold and the second threshold may be preset, which are not limited herein.

For example, N is 2, the preset period is 50 ms, the first threshold is 3V and the second threshold is 0.01 A. The charging system works in the battery charging state, and the bidirectional voltage conversion circuit works in the boost mode with a voltage conversion ratio of 1:2. If the battery voltage is 2.8V and the current is 1 A at a time $t_1$, the output voltage of the charging branch in the power management integrated circuit is controlled to be 1.4V, and the voltage of 1.4V is processed by the bidirectional voltage conversion circuit to output a voltage of 2.8V to charge the battery. After this, the battery voltage and the current are detected continuously, and the output voltage of the charging branch in the power management integrated circuit is adjusted according to the detected result. As the charging process proceeds, at a time ($t_2$+50 ms), it is detected that the battery voltage is 3V and the current is 0.3 A, the output voltage of the charging branch in the power management integrated circuit is controlled to be 1.5V. The above charging process may be repeated, to charge the battery and detect the battery voltage and the current. After several preset periods, at a time $t_3$, it is detected that the battery voltage is 3V and the current is 0.01 A, it can be determined that the battery voltage reaches the first threshold and the current reaches the second threshold. At this time, the battery can be charged continuously according to the current output voltage.

It should be noted that the above examples of the N value, the voltage conversion ratio, the battery voltages and the output voltage of the power management integrated circuit shall not be construed to limit the present disclosure.

In a second situation, when the charging system works in the battery discharging state, the working mode of the bidirectional voltage conversion circuit is controlled to the buck mode, and the discharging branch in the power management integrated circuit is controlled to work.

For example, N is 3. The charging system works in the battery discharging state, and the bidirectional voltage conversion circuit works in the buck mode with a voltage conversion ratio of 3:1. The discharging branch in the power management integrated circuit is controlled to work to supply power to the system. In the embodiments of the present disclosure, the battery voltage and the current of the battery to be charged may be determined first, and then the working mode of the bidirectional voltage conversion circuit and the working state of the power management integrated circuit may be controlled according to the battery voltage and the current. Therefore, the working mode of the bidirectional voltage conversion circuit and the working state of the power management integrated circuit may be controlled according to the battery voltage and the current, to charge batteries of various voltage levels and to meet the charging demand of the battery in different situations. The present charging system has a simple circuit structure and a low cost.

Figure 4:
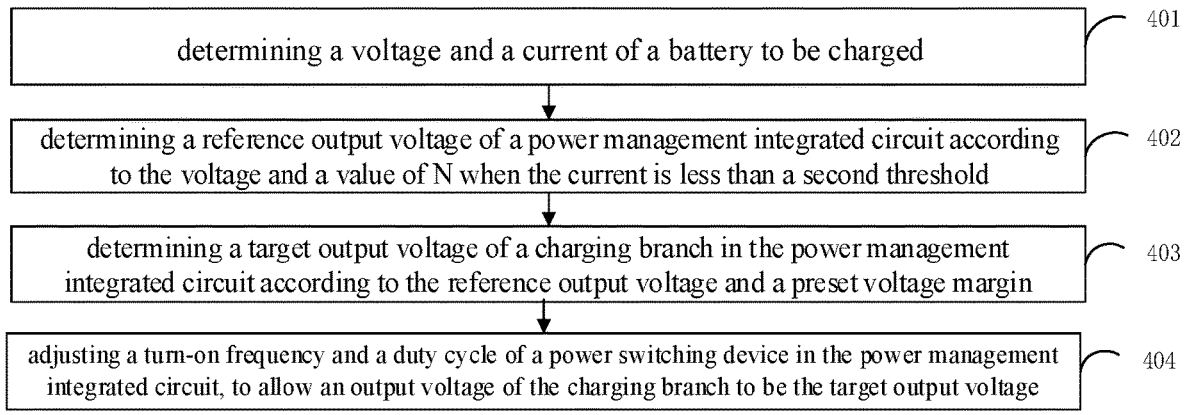
FIG. 4 is a flow chart of a method for controlling a charging system according to an embodiment of the present disclosure.

FIG. 4 is a flow chart of a method for controlling a charging system according to an embodiment of the present disclosure. As shown in FIG. 4, the method for controlling the charging system includes the following operations.

In block 401, a voltage and a current of a battery to be charged are determined.

In block 402, when the current is less than a second threshold, a reference output voltage of the power management integrated circuit is determined according to the voltage of the battery and the value of N.

In an embodiment, the second threshold is a value set in advance, for example may be 0.01 A or 0.001 A, which is not limited herein.

For example, N is 3, and the current is less than the second threshold. If the current battery voltage is 3V and the bidirectional voltage conversion circuit works in the boost mode with a voltage conversion ratio of 1:3, it can be determined that the reference output voltage of the power management integrated circuit is 1V, which is not limited herein.

In block 403, a target output voltage of the charging branch in the power management integrated circuit is determined according to the reference output voltage and a preset voltage margin.

In an embodiment, the preset voltage margin is determined by measuring an impedance of the circuit of the system. It can be understood that the preset voltage margins corresponding to different circuit layouts may be the same or may be different, which is not limited in the present disclosure.

For example, when the reference output voltage is 1V, and the present voltage margin is 0.1V, it is determined that the target output voltage of the charging branch in the power management integrated circuit is no less than 1.1V, such as 1.15V and 1.2V, which is not limited herein.

In block 404, a turn-on frequency and a duty cycle of a power switching device in the power management integrated circuit are adjusted, to allow the output voltage of the charging branch to be the target output voltage.

For example, the output voltage is 1V, and the power switching device in the power management integrated circuit has a turn-on frequency of $a_1$ and a duty cycle of $q_1$. If the target output voltage is 1.2V, the turn-on frequency of $a_1$ and the duty cycle of $q_1$ are adjusted to a turn-on frequency of $a_2$ and a duty cycle of $q_2$, respectively, to allow the output voltage of the charging branch to be the target output voltage, i.e., 1.2V.

It should be noted that the above examples of the N value, the battery voltage, the voltage margin and the target output voltage of the power management integrated circuit shall not be construed to limit the present disclosure.

It should be understood that, in a case the charging system includes a capacitive voltage conversion circuit, when charging the battery, a voltage conversion circuit is selected to match a type of a power adapter.

In some embodiments, the type of the power adapter currently connected with the charging system is determined. If the type of the power adapter matches the capacitive voltage conversion circuit, the capacitive voltage conversion circuit is controlled to work, and the power management integrated circuit and the bidirectional voltage conversion circuit are controlled to stop working.

The power adapter may be of any type, for example, it may be a power adapter that supports a normal charging process, or it may be a power adapter that supports a fast charging process, which is not limited in the present disclosure.

In addition, the capacitive voltage conversion circuit, which may also referred as a charge pump, is an energy storage converter that uses a flying or pumping capacitor to increase or decrease an input voltage to achieve the fast charging.

It should be understood that if the power adapter of one type supports the fast charging, it can be determined that it matches the capacitive voltage conversion circuit, and thus the fast charging can be performed. In this case, the capacitive voltage conversion circuit is controlled to work, and the power management integrated circuit and the bidirectional voltage conversion circuit are controlled to stop working.

When the type of the power adapter does not match the capacitive voltage conversion circuit, the capacitive voltage conversion circuit is controlled to stop working, and the power management integrated circuit and the bidirectional voltage conversion circuit are controlled to work.

For example, when the power adapter of one type supports a normal charging and it does not match the capacitive voltage conversion circuit, the capacitive voltage conversion circuit is controlled to stop working, and the power management integrated circuit is controlled to work in the battery charging state, and the bidirectional voltage conversion circuit is controlled to work in the boost mode.

In the embodiments of the present disclosure, the battery voltage and the current of the battery to be charged may be determined. Then in a case that the current is less than the second threshold, the reference output voltage of the power management integrated circuit is determined according to the voltage of the battery and the value of N. The target output voltage of the charging branch in the power management integrated circuit is determined according to the reference output voltage and the preset voltage margin. The turn-on frequency and the duty cycle of the power switching device in the power management integrated circuit are adjusted, to allow the output voltage of the charging branch to be the target output voltage. Therefore, the target output voltage of the power management integrated circuit can be determined according to the battery voltage, the current, the preset voltage margin and the voltage conversion ratio of the bidirectional voltage conversion circuit. On this basis, the power management integrated circuit may be adjusted to charge batteries of various voltage levels and to meet the charging demand of the battery in different situations. The present charging system has a simple circuit structure and a low cost.

Figure 5:
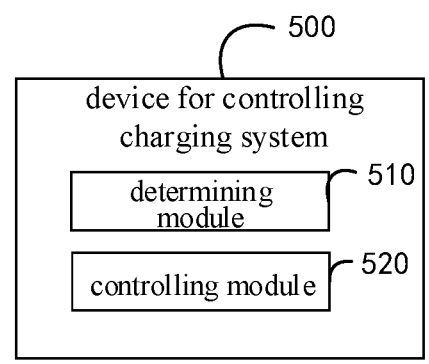
FIG. 5 is a block diagram of a device for controlling a charging system according to an embodiment of the present disclosure.

In embodiments of the present disclosure, a device for controlling a charging system is provided. FIG. 5 is a block diagram of a device for controlling a charging system according to an embodiment of the present disclosure.

As shown in FIG. 5, the device 500 for controlling the charging system includes a determining module 510 and a controlling module 520. The determining module 510 is configured to determine a voltage and a current of a battery to be charged. The controlling module 520 is configured to control a working mode of a bidirectional voltage conversion circuit and a working state of a power management integrated circuit according to the voltage and the current of the battery.

The device 500 of the present disclosure is applied to control the charging system provided in the embodiments of the present disclosure, and thus details and advantages of the embodiments of the charging system are also applicable to the embodiments of the device for controlling the charging system.

In some embodiments, the boost mode of the bidirectional voltage conversion circuit has a voltage conversion ratio of 1:N, and the buck mode of the bidirectional voltage conversion circuit has a voltage conversion ratio of N:1, where N is a positive number greater than 1. The controlling module 520 is configured to: when the charging system works in a battery charging state, control the working mode of the bidirectional voltage conversion circuit to be the boost mode, and control an output voltage of a charging branch in the power management integrated circuit according to the voltage and the current of the battery, and a value of N; and when the charging system works in a battery discharging state, control the working mode of the bidirectional voltage conversion circuit to be the buck mode, and control a discharging branch in the power management integrated circuit to be in a working state.

In some embodiments, the controlling module 520 is further configured to periodically control the output voltage of the charging branch in the power management integrated circuit according to the voltage, and the current of the battery, and the value of N, until the voltage reaches a first threshold, and the current reaches a second threshold.

In some embodiments, when the charging system works in the battery charging state and the current is less than a second threshold, the controlling module 520 is further configured to: determine a reference output voltage of the power management integrated circuit according to the voltage of the battery and the value of N, determine a target output voltage of the charging branch in the power management integrated circuit according to the reference output voltage and a preset voltage margin, and adjust a turn-on frequency and a duty cycle of a power switching device in the power management integrated circuit, to allow the output voltage of the charging branch to be the target output voltage.

In some embodiments, the charging system further includes a capacitive voltage conversion circuit, and the controlling module 520 is further configured to: determine a type of a power adapter currently connected with the charging system; control the capacitive voltage conversion circuit to work, and control the power management integrated circuit and the bidirectional voltage conversion circuit to stop working, when the type of the power adapter matches the capacitive voltage conversion circuit; and control the capacitive voltage conversion circuit to stop working, and control the power management integrated circuit and the bidirectional voltage conversion circuit to work, when the type of the power adapter does not match the capacitive voltage conversion circuit.

Functions and specific implementations of the above modules in the embodiments of the present disclosure may refer to the details of the method embodiments, which are not elaborated here.

With the device for controlling the charging system of the present disclosure, the battery voltage and the current of the battery to be charged may be determined, and the working mode of the bidirectional voltage conversion circuit and the working state of the power management integrated circuit are controlled according to the voltage and the current of the battery. Therefore, the working mode of the bidirectional voltage conversion circuit and the working state of the power management integrated circuit are controlled according to the voltage and the current of the battery, to charge batteries of various voltage levels and to meet the charging demand of the battery in different situations. The present charging system has a simple circuit structure and a low cost.

In embodiments of the present disclosure, an electronic device is provided, and it includes the charging system as described above.

Further, the electronic device may further include a memory.

It should be understood that the controller of the charging system can implement the method for controlling the charging system described in any embodiment of the present disclosure by calling a program stored in the memory.

In the description of the present disclosure, it should be understood that, unless specified or limited otherwise, the terms "connected," and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

Those skilled in the art may readily have other embodiments of the present disclosure after considering the specification and practicing the invention disclosed herein. Variations, uses, and changes which follow the general principle of the present disclosure and include common knowledge or conventional technical means in the art that is not disclosed in the present disclosure are within the scope of the present disclosure. The description and the embodiments are illustrative only, and the true scope and spirit of the present disclosure are indicated by the appended claim.

All the embodiments of the present disclosure can be executed individually or in combination with other embodiments, which is not limited in the present disclosure.

It should be understood that the present disclosure is not limited to the precise structures described above and illustrated in the drawings, and various modifications and changes may be made without departing from the scope thereof. The scope of the present disclosure is merely limited by the appended claims.

What is claimed is:

1. A charging system, comprising:
    a power management integrated circuit;
    a bidirectional voltage conversion circuit, the bidirectional voltage conversion circuit being configured to work in a working mode comprising at least a boost mode and a buck mode;
    a controller having a first input terminal; and
    a battery level detection circuit,
        an input terminal of the battery level detection circuit being connected to a battery,
        an output terminal of the battery level detection circuit being connected to the first input terminal of the controller, and
        the battery level detection circuit being configured to detect a voltage and a current of the battery and transmit the voltage and the current of the battery to the controller, and
    wherein the controller is configured to control the working mode of the bidirectional voltage conversion circuit and a working state of the power management integrated circuit according to the voltage and the current of the battery.

2. The charging system according to claim 1, wherein:
    the boost mode of the bidirectional voltage conversion circuit has a voltage conversion ratio of 1:N, and the buck mode of the bidirectional voltage conversion circuit has a voltage conversion ratio of N:1, where N is a positive number greater than 1, and
    the controller is further configured to:
        when the charging system works in a battery charging state, control the working mode of the bidirectional voltage conversion circuit to be the boost mode, and control an output voltage of a charging branch in the power management integrated circuit according to the voltage and the current of the battery, and a value of N, and
        when the charging system works in a battery discharging state, control the working mode of the bidirectional voltage conversion circuit to be the buck mode, and control a discharging branch in the power management integrated circuit to be in a working state.

3. The charging system according to claim 2, wherein the controller is further configured to:
    when the charging system works in the battery charging state, periodically control the output voltage of the charging branch in the power management integrated circuit according to the voltage and the current of the battery, and the value of N, until the voltage reaches a first threshold, and the current reaches a second threshold.

4. The charging system according to claim 2, wherein the controller is further configured to:
    when the charging system works in the battery charging state and the current is less than a second threshold,
    determine a reference output voltage of the power management integrated circuit according to the voltage of the battery and the value of N,
    determine a target output voltage of the charging branch in the power management integrated circuit according to the reference output voltage and a preset voltage margin, and
    adjust a turn-on frequency and a duty cycle of a power switching device in the power management integrated circuit, to allow the output voltage of the charging branch to be the target output voltage.

5. The charging system according to claim 1, wherein a first input terminal of the power management integrated circuit is connected to a voltage input, a first output terminal and a second input terminal of the power management integrated circuit are connected to a first terminal of the bidirectional voltage conversion circuit, a second output terminal of the power management integrated circuit is connected to a power supply terminal of the controller, and a control terminal of the power management integrated circuit is connected to a first output terminal of the controller, and
    wherein a second terminal of the bidirectional voltage conversion circuit is connected to the battery, and a control terminal of the bidirectional voltage conversion circuit is connected to a second output terminal of the controller.

6. The charging system according to claim 1, further comprising a capacitive voltage conversion circuit and a handshake circuit,
    wherein an input terminal of the handshake circuit is connected to the voltage input, an output terminal of the handshake circuit is connected to a second input terminal of the controller, and the handshake circuit is configured to communicate with a power adapter to determine a type of the power adapter and send the type of the power adapter to the controller;

wherein the controller is further configured to control the capacitive voltage conversion circuit to work, and control the power management integrated circuit and the bidirectional voltage conversion circuit to stop working, when the type of the power adapter matches the capacitive voltage conversion circuit; and wherein the controller is further configured to control the capacitive voltage conversion circuit to stop working, and control the power management integrated circuit and the bidirectional voltage conversion circuit to work, when the type of the power adapter does not match the capacitive voltage conversion circuit.

7. The charging system according to claim 1, further comprising an over voltage protection circuit, wherein the over voltage protection circuit is disposed between a voltage input and the power management integrated circuit.

8. A method for controlling a charging system, the charging system comprising:
   a power management integrated circuit;
   a bidirectional voltage conversion circuit, the bidirectional voltage conversion circuit being configured to work in a working mode comprising at least a boost mode and a buck mode;
   a controller having a first input terminal; and
   a battery level detection circuit,
      an input terminal of the battery level detection circuit being connected to a battery,
      an output terminal of the battery level detection circuit being connected to the first input terminal of the controller, and
      the battery level detection circuit being configured to detect a voltage and a current of the battery and transmit the voltage and the current of the battery to the controller, and
   wherein the controller is configured to control the working mode of the bidirectional voltage conversion circuit and a working state of the power management integrated circuit according to the voltage and the current of the battery, and
   wherein the method comprises:
   determining a voltage and a current of a battery to be charged, and
   controlling the working mode of the bidirectional voltage conversion circuit and the working state of the power management integrated circuit according to the voltage and the current of the battery.

9. The method according to claim 8, wherein the boost mode of the bidirectional voltage conversion circuit has a voltage conversion ratio of 1:N, and the buck mode of the bidirectional voltage conversion circuit has a voltage conversion ratio of N:1, where N is a positive number greater than 1, and
   wherein controlling the working mode of the bidirectional voltage conversion circuit and the working state of the power management integrated circuit according to the voltage and the current of the battery comprises:
   when the charging system works in a battery charging state, controlling the working mode of the bidirectional voltage conversion circuit to be the boost mode, and controlling an output voltage of a charging branch in the power management integrated circuit according to the voltage and the current of the battery, and a value of N, and
   when the charging system works in a battery discharging state, controlling the working mode of the bidirectional voltage conversion circuit to be the buck mode, and controlling a discharging branch in the power management integrated circuit to be in a working state.

10. The method according to claim 9, wherein controlling the output voltage of the charging branch in the power management integrated circuit according to the voltage and the current of the battery, and the value of N comprises:
    periodically controlling the output voltage of the charging branch in the power management integrated circuit according to the voltage and the current of the battery, and the value of N, until the voltage reaches a first threshold, and the current reaches a second threshold.

11. The method according to claim 9, wherein controlling the output voltage of the power management integrated circuit according to the voltage and the current of the battery, and the value of N comprises:
    determining a reference output voltage of the power management integrated circuit according to the voltage of the battery and the value of N when the current is less than a second threshold,
    determining a target output voltage of the charging branch in the power management integrated circuit according to the reference output voltage and a preset voltage margin,
    adjusting a turn-on frequency and a duty cycle of a power switching device in the power management integrated circuit, to allow the output voltage of the charging branch to be the target output voltage.

12. The method according to claim 8, wherein the charging system further comprises a capacitive voltage conversion circuit, and the method further comprises:
    determining a type of a power adapter currently connected with the charging system;
    controlling the capacitive voltage conversion circuit to work, and controlling the power management integrated circuit and the bidirectional voltage conversion circuit to stop working, when the type of the power adapter matches the capacitive voltage conversion circuit; and
    controlling the capacitive voltage conversion circuit to stop working, and controlling the power management integrated circuit and the bidirectional voltage conversion circuit to work, when the type of the power adapter does not match the capacitive voltage conversion circuit.

13. An electronic device comprising a charging system, wherein the charging system comprises:
    a power management integrated circuit;
    a bidirectional voltage conversion circuit, the bidirectional voltage conversion circuit being configured to work in a working mode comprising at least a boost mode and a buck mode;
    a controller having a first input terminal; and
    a battery level detection circuit,
       an input terminal of the battery level detection circuit being connected to a battery,
       an output terminal of the battery level detection circuit being connected to the first input terminal of the controller, and
       the battery level detection circuit being configured to detect a voltage and a current of the battery and transmit the voltage and the current of the battery to the controller, and
    wherein the controller is configured to control the working mode of the bidirectional voltage conversion circuit and a working state of the power management integrated circuit according to the voltage and the current of the battery.

14. The electronic device according to claim 13, wherein the boost mode of the bidirectional voltage conversion circuit has a voltage conversion ratio of 1:N, and the buck mode of the bidirectional voltage conversion circuit has a voltage conversion ratio of N:1, where N is a positive number greater than 1, and the controller is further configured to:

when the charging system works in a battery charging state, control the working mode of the bidirectional voltage conversion circuit to be the boost mode, and control an output voltage of a charging branch in the power management integrated circuit according to the voltage and the current of the battery, and a value of N, and when the charging system works in a battery discharging state, control the working mode of the bidirectional voltage conversion circuit to be the buck mode, and control a discharging branch in the power management integrated circuit to be in a working state.

15. The electronic device according to claim 14, wherein the controller is further configured to:

when the charging system works in the battery charging state, periodically control the output voltage of the charging branch in the power management integrated circuit according to the voltage and the current of the battery, and the value of N, until the voltage reaches a first threshold, and the current reaches a second threshold.

16. The electronic device according to claim 14, wherein the controller is further configured to:

when the charging system works in the battery charging state and the current is less than a second threshold, determine a reference output voltage of the power management integrated circuit according to the voltage of the battery and the value of N, determine a target output voltage of the charging branch in the power management integrated circuit according to the reference output voltage and a preset voltage margin, and adjust a turn-on frequency and a duty cycle of a power switching device in the power management integrated circuit, to allow the output voltage of the charging branch to be the target output voltage.

17. The electronic device according to claim 13, wherein the first input terminal of the power management integrated circuit is connected to a voltage input, a first output terminal and a second input terminal of the power management integrated circuit are connected to a first terminal of the bidirectional voltage conversion circuit, a second output terminal of the power management integrated circuit is connected to a power supply terminal of the controller, and a control terminal of the power management integrated circuit is connected to a first output terminal of the controller, and wherein a second terminal of the bidirectional voltage conversion circuit is connected to the battery, and a control terminal of the bidirectional voltage conversion circuit is connected to a second output terminal of the controller.

18. The electronic device according to claim 13, further comprising a capacitive voltage conversion circuit and a handshake circuit, wherein an input terminal of the handshake circuit is connected to the voltage input, and an output terminal of the handshake circuit is connected to a second input terminal of the controller, to allow the handshake circuit to communicate with a power adapter to determine a type of the power adapter and send the type of the power adapter to the controller;

wherein the controller is further configured to control the capacitive voltage conversion circuit to work, and control the power management integrated circuit and the bidirectional voltage conversion circuit to stop working, when the type of the power adapter matches the capacitive voltage conversion circuit; and wherein the controller is further configured to control the capacitive voltage conversion circuit to stop working, and control the power management integrated circuit and the bidirectional voltage conversion circuit to work, when the type of the power adapter does not match the capacitive voltage conversion circuit.

19. The electronic device according to claim 13, further comprising an over voltage protection circuit, wherein the over voltage protection circuit is disposed between a voltage input and the power management integrated circuit.

20. The electronic device according to claim 13, further comprising one or more connectors.

* * * * *